3,326,756
METHOD OF TREATING ILEUS AND SHOCK ASSOCIATED THEREWITH
Paul Francis O'Hollaren, Seattle, Wash., assignor to Enzomedic Laboratories, Inc., a corporation of Washington
No Drawing. Filed Feb. 8, 1966, Ser. No. 525,835
7 Claims. (Cl. 167—56)

This invention is concerned with a method of treating ileus and shock. In particular, it relates to the use of diphosphopyridine nucleotide (hereinafter referred to as DPN) for the treatment of various forms of ileus and shock in warm blooded animals.

Ileus is defined as an obstruction of the bowel producing severe colic, whereas paralytic ileus is due to local inflammation blocking the passage of peristaltic waves so that abdominal sounds are absent. When fluid and gas accumulate in the intestine, they cause distention, abdominal discomfort and vomiting.

Shock is defined as a state of collapse caused by acute peripheral circulatory failure due to derangement of circulatory control or loss of circulating fluid brought about by injury. It is marked by pallor and clamminess of the skin, decreased blood pressure, feeble rapid pulse, decreased respiration, restlessness, anxiety and sometimes unconsciousness. It may occur in such conditions as severe trauma, major surgery, massive hemorrhage, dehydration, severe infection and drug toxicity. Despite massive whole blood transfusions, the circulation gradually fails, the arterial blood pressure cannot be sustained and the patient dies.

One object of the present invention is to provide compositions which can be readily and conveniently administered to warm blooded animals afflicted with ileus and in a state of shock. Other objects will become apparent from the specification and appended claims.

This invention is predicated upon the discovery that DPN is extremely effective in counteracting the symptoms of ileus and shock when internally administered to a warm blooded animal orally, rectally, intramuscularly and preferably intravenously in combination with a non-toxic, pharmaceutical, liquid or solid carrier. DPN is a co-enzyme which can be isolated from fresh baker's yeast and is commercially available as a white powder freely soluble in water. Thus, it can be readily dissolved in sterile, isotonic, aqueous saline solution and conveniently administered intravenously or intramuscularly to a living host suffering from the effects of ileus or shock. DPN in a gelatin suppository is recommended for rectal use since rapid absorption is necessary for effective treatment of the symptoms encountered.

In preparing compositions suitable for use in the practice of the invention, DPN can be mixed with such substances as water, lactose, starch, stearic acid, magnesium stearate, talc, vegetable oils, benzyl alcohol, gum, wax, propylene glycol or the like. Such compositions should be in liquid form as solutions, suspensions or emulsions for intravenous or intramuscular injections to which can be added preserving agents, stabilizing agents, wetting agents, emulsifying agents, buffers or salts to adjust the pH or vary the osmotic pressure. For rectal use, DPN in combination with any of the foregoing liquid or solid carriers should be sealed in a gelatine capsule. Orally for use as a maintenance dose after cardiac output has increased, one can compress DPN with a solid carrier in the form of a tablet which is enteric coated with cellulose acetate phthalate or the like.

Various dosages of the foregoing compositions can be employed depending upon the route of administration. Intravenously, it is preferable to dissolve one gram of DPN in 200 to 300 milliliters of buffered, aqueous, saline solution and administer the same by the well-known drip technique at a rate of from 20 to 35 drops per minute. This dosage can be repeated as necessary to restore normal conditions. If desired, one gram of DPN in 10 milliliters of buffered saline solution can be injected in a single dose via the jugular vein. Intramuscularly, from 100 to 200 milligrams of DPN dissolved in about 3 milliliters of buffered aqueous solution is injected in a single dose and repeated every 2 or 3 hours until the host is no longer in shock and the pulse is normal. Rectally, the dosage should be about one gram of DPN repeated about every 3 or 4 hours within a single day. Orally, one should give from 1 to 4 grams of DPN daily in a gelatin capsule or enteric coated tablet to prevent relapse once the patient has initially recovered from ileus or shock. Since DPN is substantially non-toxic, there is very little danger in overdosage.

The following examples illustrate the method and compositions contemplated to be within the scope of the present invention.

EXAMPLE 1

A 56-year-old female was admitted to the hospital in acute pain and shock, secondary to perforated duodenal ulcer. The patient was taken to surgery and the perforated bowel was repaired. Following surgery, she developed a severe generalized peritonitis with marked ileus and distention. This aggravated her already serious condition and the patient developed a high temperature, rapid thready pulse and shallow respirations. On the 4th post operative day, the patient began to hallucinate and soon developed acute delirium. On the 6th post operative day, the patient developed grand mal seizures at frequent intervals and her condition rapidly deteriorated. On the 7th post operative day, the patient was classified clinically as terminal from generalized shock, circulatory collapse, repeated convulsion, peritonitis ileum and was still in delirium.

One gram of DPN in 250 ml. of buffered normal saline solution, was then administered by intravenous drip. Within a few minutes active bowel tones were heard for the first time in several days. Within a short period of time the patient began to expel copious quantities of stool and flatus. A few hours later, it was obvious that the ileus had disappeared and the patient had been restored to normal bowel function. The deep cyanosis and circulatory collapse had disappeared and the patient's state of shock was overcome as manifested by the return of the pulse to 78, blood pressure to 120/70 and a restoration of a normal healthy color to the skin. Another gram of DPN was administered 18 hours later and within 3 hours, the patient was no longer delirious and had been restored to a clear mental and emotional state. Her temperature dropped from 104° F. to 99° F. The pulse and respiration were within normal range and the patient was hungry and began taking tourishment by mouth. From then on her post operative course was uneventful and she was discharged in good condition 8 days later.

EXAMPLE 2

A 52-year-old male was admitted to the hospital suffering from severe acute abdominal pain, a high temperature and three days later was taken to surgery and a perforated bowel was repaired. On the 5th post operative day, the patient developed severe paralytic ileus, delirium and severe convulsions which quickly deteriorated to status epilepticus. Because of the frequency of the grand mal seizures, the high temperature, rapid pulse and marked shock effect of the generalized peritonitis, abdominal pain and paralytic ileus, the patient was soon in circulatory collapse.

One gram of DPN in 250 ml. of buffered normal saline solution was administered by intravenous drip on the 5th post operative day. Within a few minutes, active bowel tones were heard and there was a marked increase in the bowel activities with the expulsion of copious quantities of stool and flatus. The second gram of DPN was administered six hours later and another gram eight hours thereafter. The following day the patient was mentally alert, sitting up in bed and taking nourishment. The abdomen was flat, bowel tones were active, the pain of distention was gone, the pulse was 80, respiration 20, color was excellent, blood pressure was 130/76. The patient was completely free from his symptoms of ileus and shock. The patient continued to make excellent progress and was discharged from the hospital in good condition several days later.

EXAMPLE 3

A 15 lb. mongrel dog was anethetized with pentobarbital to a stage of deep anesthesia. The abdomen was then opened with a mid line incision and the ileum and jejunum were then exteriorized from the abdominal cavity and exposed and traumatized. At the end of six hours of exposure, obvious bowel distention and loss of bowel activity had occurred and the animal was in surgical shock, blood pressure was unobtainable, the pulse was 170 and thready, respirations were shallow-gasping in nature and at the rate of 50 per minute. Fifty percent of the blood volume was then withdrawn to further deepen the shock, producing what was an imminent terminal state. At this point when death seemed imminent, one gram of DPN in 10 ml. of saline solution were injected into the right jugular vein of the animal. In one minute the exposed ileum and jejunum developed active motility producing quick expulsion of the developed flatus. The respirations immediately slowed and simultaneously produced a maximum increase in the vital exchange, utilizing the maximum vital capacity of the animal. The pulse rate dropped from 170 to 100 and became full and bounding instead of thin and thready. This produced rapid oxygenation of the blood with immediate disappearance of the cyanosis. The bowel was returned to the abdominal cavity. The abdominal wall was quickly closed with continuous cat gut sutures and black silk to the skin and the animal was returned to his cage. In 20 minutes the animal was standing completely alert in his cage, wagging his tail and barking for food, which he enjoyed.

EXAMPLE 4

A 20 lb. mongrel dog was anesthetized with pentobarbital to a stage of deep anesthesia. The abdomen was opened with a mid line incision and the ileum and jejunum were then exteriorized from the abdominal cavity and exposed and traumatized.

After a period of six hours of exposure, bowel distention and loss of bowel activity had occurred and the animal was in surgical shock. Unable to obtain blood pressure, pulse was thready, respirations shallow and gasping in nature. An imminent terminal state was produced by withdrawing 50% of the blood volume.

At this point one gram of DPN in 10 ml. of saline solution were injected into the right jugular vein of the animal and in one minute the exposed ileum and jejunum developed activity producing quick expulsion of the developed flatus. A maximum increase in the vital exchange was produced, utilizing the maximum vital capacity of the animal, cyanosis disappeared and the bowel was returned to the abdominal cavity. The abdominal wall was closed and the animal was returned to his cage and in less than 30 minutes was alert and wagging his tail.

From the foregoing examples, it is apparent that DPN is an effective aid in rapidly relieving the symptoms of ileus and shock when administered intravenously. Similar effects are observed when DPN is given internally by the oral, intramuscular or rectal route. Although preferred dosages are set forth, it should be emphasized that larger dosages at more frequent intervals can be given depending upon the needs of the individual.

I claim:

1. A method of treating ileus and shock which comprises internally administering to a warm blooded animal evidencing symptoms of ileus and shock associated therewith a pharmaceutical composition containing diphosphopyridine nucleotide in an amount sufficient to reduce said symptoms.

2. A method as claimed in claim 1 in which the composition is administered intravenously.

3. A method as claimed in claim 1 in which the composition is administered intramuscularly.

4. A method as claimed in claim 1 in which the composition is administered rectally.

5. A method as claimed in claim 1 in which the composition is administered orally.

6. A method as claimed in claim 1 in which the composition is administered intravenously in a daily dosage of from 1 to 4 grams of diphosphopyridine nucleotide dissolved in a buffered, aqueous, normal saline solution.

7. A method as claimed in claim 1 in which the composition is administered rectally in a daily dosage of at least one gram of diphosphopyridine nucleotide contained in a gelatin capsule.

No references cited.

ALBERT T. MEYERS, *Primary Examiner.*

JULIAN S. LEVITT, *Examiner.*

STANLEY J. FRIEDMAN, *Assistant Examiner.*